Figure 2:
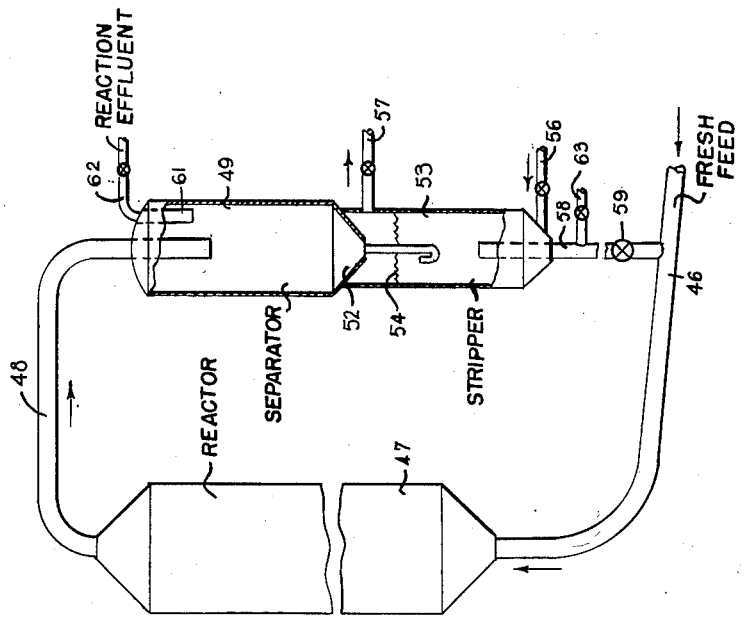

June 2, 1953

L. R. HILL ET AL 2,640,843

SYNTHESIS OF ORGANIC COMPOUNDS

Filed June 15, 1948

INVENTOR.
LUTHER R. HILL
HENRY G. MC GRATH
BY E. F. Liebrecht
Cruzan Alexander
ATTORNEYS Patented June 2, 1953

2,640,843

UNITED STATES PATENT OFFICE 2,640,843

SYNTHESIS OF ORGANIC COMPOUNDS

Luther R. Hill, Ridgewood, and Henry G. McGrath, Elizabeth, N. J., assignors to The M. W. Kellogg Company, Jersey City, N. J., a corporation of Delaware Application June 15, 1948, Serial No. 33,078

4 Claims. (Cl. 260—449.6)

1

This invention relates to a process for hydrogenating carbon oxides to produce organic compounds. The process of the present invention involves reacting hydrogen and carbon monoxide under highly efficient conditions to produce hydrocarbons having more than one carbon atom per molecule and oxygenated organic compounds. The present process is applicable also in reacting hydrogen with other organic compounds containing the carbonyl group and herein designated as carbon oxides, such as carbon dioxide, ketones, aldehydes, acyl halides, organic acids and their salts and esters, acid anhydrides, and amines. In the following description of the invention the hydrogenation of carbon monoxide will be referred to specifically. It will be understood, however, that the invention is of wider application, including within its scope the hydrogenation of any suitable carbon oxide.

Hydrogen and carbon monoxide have been made to react exothermically in the presence of iron or an iron oxide catalyst under specific reaction conditions to produce hydrocarbons and oxygenated organic compounds. In general, the synthesis of organic compounds by the hydrogenation of carbon monoxide in the presence of an iron catalyst is effected at a temperature between about 500 and 700° F. and at a pressure between about atmospheric and about 500 pounds per square inch gage.

The synthesis feed gas or reaction mixture comprises a mixture of 1 to 3 mols of hydrogen per mol of carbon monoxide and may be prepared by various methods including the catalytic conversion of natural gas, steam and carbon dioxide, the partial oxidation of natural gas, and the gasification of coal with steam and oxygen.

Most recent developments in the synthesis of organic compounds from hydrogen and carbon monoxide have involved the use of finely divided catalysts in a fluidized condition either entrained or suspended in the reaction mixture in the reaction zone. This type of operation has several apparent advantages over the conventional fixed bed operation and has yielded organic compounds of high quality and in larger quantity per pound of catalyst. One of the difficulties encountered in fixed bed operations which to a large degree has been eliminated in the newer fluidized processes is the removal of heat of reaction from the reaction zone. Because of the high heat transfer rate of the fluidized contact mass, the heat may be rapidly removed from the reaction zone in the fluidized processes which in turn permits the use of higher overall temperatures and greater capacities.

2

For most successful operations of the fluidized processes, it has been found according to this invention that the residence time of the catalyst particles in the reaction mixture is a critical factor in obtaining continuous uninterrupted operations, high yields of normally liquid products including hydrocarbons and oxygenated organic compounds, and maximum length of catalyst life.

The object of this invention is to provide an improved process for the hydrogenation of carbon oxides in the presence of catalysts comprising iron to produce organic compounds.

Another object of this invention is to provide a process in which the necessity for conventional regeneration of hydrogenation catalysts may be eliminated.

It is still a further object of this invention to obtain higher yields of oxygenated organic compounds than heretofore possible with similar catalysts under comparable conditions of operation with fluidized processes.

It is a further object of this invention to maintain the hydrogenation catalyst during use at its maximum activity and optimum selectivity.

Yet another object of this invention is to provide a process for the hydrogenation of carbon monoxide to produce organic compounds at lower pressures than heretofore practiced for selective yields of normally liquid organic compounds.

Various other objects and advantages of this invention will become apparent to those skilled in the art from the accompanying description and disclosure.

According to this invention, it has been found that the maximum permissible contact of a finely divided metal hydrogenating catalyst per pass with carbon monoxide is equivalent to about 2.5 standard cubic feet of carbon oxide per pound of catalyst calculated as elementary metal. By limiting the amount of carbon oxide which contacts the catalyst, particularly an iron or iron oxide catalyst, deactivation of the catalyst is minimized and the agglomeration or deaeration of the fluidized catalyst is prevented. After contact of the catalyst with not more than 2.5 standard cubic feet of carbon oxide, particularly carbon monoxide, the catalyst is removed from contact with the reaction mixture and occluded vaporous reaction products are separated from the catalyst. Separation of occluded gases from the catalyst may be accomplished by allowing the finely divided catalyst to settle or pack in an aerated passageway. Preferably, however, not only is it desirable to remove occluded gases from the catalyst but also it is desirable to remove at least a portion of occluded and/or adsorbed waxes and relatively high boiling organic compounds. These heavier materials may be removed from the catalyst by stripping at a temperature below about 650° F. for a short period of time with a suitable gaseous medium, such as hydrogen, recycle gas, fresh feed gas, methane, nitrogen, and steam. In the preferred embodiment, the catalyst is stripped with hydrogen or recycle gas. After removal of occluded gases, etc., the catalyst is returned directly to the reaction mixture without the necessity for the conventional regeneration procedure including oxidation at an elevated temperature to remove carbonaceous deposits and/or reduction of oxidized catalyst. The stripping operation of this invention is a relatively mild treatment as compared to the conventional regeneration of catalyst now practiced.

Control of the amount of carbon oxide, such as carbon monoxide, which contacts the catalyst per pass is accomplished by regulating the charging rate of the catalyst to the reaction zone and its subsequent removal therefrom. In those instances in which catalyst is entrained in a rapidly flowing gaseous mixture passing through a reaction zone of relatively small cross-sectional area, the amount of contact between carbon monoxide and catalyst is substantially a direct function of the charging rate of the catalyst to the reactor. However, when the catalyst is suspended in a reaction zone of relatively large cross-sectional area in a so-called pseudo-liquid fluidized mass in which the catalyst particles circulate throughout the mass, the amount of contact between carbon monoxide and catalyst may not be a direct function of the charging rate of the catalyst to the reactor. In the latter type of operation, there is no assurance that the withdrawal of the catalyst will constitute only catalyst which has been in the reaction zone for a certain period of time. In other words, due to the circulation of the catalyst in the contact mass a portion of the withdrawn catalyst will comprise contact material which has remained in the reaction zone for an undetermined period of time thus contacting an excessive amount of carbon monoxide. The following formula has been derived to take into account the circulation and random movement of the catalyst in the fluid bed of relatively large diameter reactors as well as the reactors of smaller dimension in which the catalyst continuously moves in the direction of flow of the gases with a minimum of random movement of the particles of catalyst. The charging rates defined by the formula for relatively large reactors using dense phase operations are sufficiently high that the catalyst turnover rate in the reactor prevents excessive holdup of the catalyst therein.

The formula shown below defines the minimum charging rate of the catalyst based on the carbon monoxide charged to the reactor to insure that not more than the above amount of carbon monoxide contacts the catalyst per pass of catalyst through the reaction zone:

$$Cr = \frac{50}{\frac{L}{D}+5} + 0.4$$

In the formula, $Cr$ is the minimum charging rate in pounds of catalyst based on the iron content thereof calculated as the elementary metal per standard cubic foot of carbon monoxide in the reaction mixture charged to the inlet of the reaction zone. The factor $$\frac{L}{D}$$

is the ratio of the length of the vertical reaction section of the reactor to its diameter and is designated as the shape factor of the reactor. $L$ is equal to the overall length of the vertical or substantially vertical reaction passageway of an elongated reactor and $D$ is the average diameter or transverse distance of the reaction passageway. The maximum charging rate is limited primarily by the capacity of the means used to charge and discharge the catalyst.

For charging rates less than the above minimum and without removal of occluded materials, reaction products such as waxes and relatively heavy organic compounds accumulate upon the catalyst and tend to cause the catalyst to agglomerate and deaerate in the reaction zone. Carbon also rapidly forms upon the catalyst under such conditions. Carbon upon the catalyst often deactivates the catalyst to such an extent that a severe regeneration treatment, such as oxidation at temperatures above 1200° F., may be required to remove it, or it may become necessary to discard the catalyst.

This invention is applicable to the high velocity system in which all of the catalyst particles are carried through a relatively small cross-sectional reaction zone with the gaseous mixture by entrainment in accordance with the explanation embodied in our prior and co-pending application Serial No. 726,620, filed February 5, 1947. The catalyst is separated from the effluent of the reaction zone, stripped or otherwise treated to remove occluded materials and recirculated to the reactor. The present invention is also applicable to those systems in which the gas velocity and the diameter of the reactor are such that the finely divided catalyst forms a so-called pseudo-liquid dense phase in which the catalyst particles are in a turbulent condition and circulate throughout the dense phase itself. In this manner of operation the reactor may be of such overall size as compared to the quantity of catalyst therein that an interface appears between a lower dense phase and an upper dilute phase in which concentration of the catalyst particles is much less than in the dense phase. The dilute phase may be considered a separation zone for in this phase catalyst particles are continuously falling back into the lower dense phase. Catalyst may be separated directly from the upper portion of the dense phase through a standpipe and/or from the effluent containing entrained catalyst. Catalyst thus separated is subjected to the removal of occluded and/or adsorbed materials and returned to the dense phase at the required rate. The height of the reaction passageway for a dense phase having a definite interface is the vertical height of the dense phase for the purposes of the above formula.

For the high velocity system the concentration of the iron catalyst is usually between about 2 and about 25 or 35 pounds per cubic foot of gas and a superficial gas velocity above about 5 feet per second is usually employed with a reactor having a shape factor greater than about 10. In the dense phase system the concentration of iron catalyst in the reaction zone is usually between about 35 and about 100 pounds per cubic foot of gas and superficial gas velocities range between about 0.5 and about 5 feet per second, preferably velocities between about 4 and about 5 feet per second are employed even with the dense phase system. The shape factor of the dense phase reactor is preferably above about 5. The catalyst concentration and gas velocities in either of the above systems depend upon the condition of the catalyst, that is the amount of carbonaceous deposits thereon and the particle size, and other factors, such as catalyst composition, operating conditions, etc. The size and shape of the reactor may vary over a wide range of diameter and heights. The reactor may comprise a single or plurality of small diameter tubes between about ½ and about 12 inches in diameter or may comprise a single reactor several feet in diameter without departing from the scope of this invention.

A reactor comprising a single tube or a plurality of tubes 1 inch in diameter positioned vertically and approximately 20 feet in length in which the catalyst passes overhead with the reaction effluent has a shape factor equal to about 240 and a minimum catalyst charging rate (Cr) calculated according to the above formula equal to approximately 0.6 pound of iron per standard cubic foot of carbon monoxide charged to the reaction zone. In the use of a reactor comprising a single tube or a plurality of tubes or reaction passageways 4 inches in diameter and approximately 40 feet in length in which the catalyst passes overhead with the reaction effluent, the shape factor is equal to 120 and the minimum charging rate (Cr) is equal to about 0.8 pound of iron per standard cubic foot of carbon monoxide charged to the reactor. In the use of a reactor comprising a single reaction passageway having a 3 feet average diameter substantially completely filled with a dense phase of catalyst and approximately 32 feet in vertical length, the shape factor is 10.6 and the minimum charging rate (Cr) is equivalent to about 3.6 pounds of iron per standard cubic foot of carbon monoxide charged to the reactor.

The catalyst employed in the present invention is a finely divided powdered catalyst comprising iron or an oxide of iron which is or becomes in the reaction zone a catalyst for the hydrogenation reaction. While the iron catalyst usually consists of iron or iron oxide, it may include a minor amount of promoting ingredients, such as alkalies, alumina, silica, titania, thoria, manganese oxide, and magnesia. In some instances the iron may be supported on a suitable support, such as a bentonite type clay, silica, and alumina, although a support is not generally used. A naturally occurring ore containing iron may be used as the catalyst with or without reduction. Mill scale is also a suitable catalyst when reduced.

The exact chemical condition of the catalyst in its most active form is not certain. It may be that the active form is present when the metal is at an optimum degree of carburization and/or oxidation; consequently, a reduced iron catalyst when first contacted with the reactants may reach a state of highest activity by being carburized or oxidized in the reaction zone. Therefore, in this specification and claims the iron catalyst employed is described by reference to its chemical composition and condition when first contacted with the reactants.

The catalyst is employed in a fine state of subdivision. Preferably, the powdered catalyst initially contains no more than a minor proportion by weight of material whose average particle diameter is greater than 250 microns. The greater proportion of the catalyst mass preferably comprises a material whose average particle diameter is smaller than 100 microns including at least 25 weight per cent of the material in a particle size smaller than 50 microns. An example of a desirable powdered catalyst is one which comprises at least 75 per cent by weight of a material smaller than 150 microns and at least 25 per cent by weight of materials smaller than 40 microns.

A fresh feed gas having a hydrogen to carbon monoxide ratio higher than the ratio in which these compounds are converted to other compounds is usually employed and the ratio of hydrogen to carbon monoxide in the reaction zone itself may be increased above the ratio of those components in the fresh feed gas and to a desired value by recycling a portion of the unconverted gas from the reaction zone, after removal of a part or all of the normally liquid product by condensation and after removal of carbon dioxide, if desired. A gas factor defined as the mol ratio of hydrogen and carbon dioxide to carbon monoxide of at least 5:1 is preferably employed. However, lower gas factors may be employed than that given above without departing from the scope of this invention. With high gas factors, a substantial excess of hydrogen in the reactor is assured by recycling and high conversions of carbon monoxide per pass are obtained. It has also been found that it is permissible for the combined inlet gas mixture to contain a substantial proportion of carbon dioxide, as much as about 5 to about 25 per cent carbon dioxide. In operating with a gas factor above about 5:1 with carbon dioxide present in the gaseous mixture in the above amount a substantial proportion of the carbon dioxide is converted to organic compounds by the conversion thereof to carbon monoxide and the subsequent conversion of the carbon monoxide thus formed to the organic compounds. The permissibility of carbon dioxide in the reaction mixture minimizes the cost of purifying the fresh feed gas before entering into the system. The presence of carbon dioxide minimizes the conversion of carbon monoxide to carbon dioxide.

When operating with excess hydrogen and substantially complete conversion of carbon monoxide per pass, a portion of the reaction effluent after removal of a major proportion of the liquid product is recycled to the reaction zone in a volumetric ratio of recycle gas to fresh feed gas between about 0.5:1 to about 10:1, generally about 1:1 to about 3:1. However, depending upon the character of the available feed gas or on the character of the desired product, it may or may not be desirable to recycle the non-condensed portion of the reaction effluent.

In operating a synthesis process within the limits of this invention with a reduced iron catalyst at a temperature between about 550 and about 650° F. and a pressure between about 50 and about 500 pounds per square inch gage, a carbon monoxide disappearance or conversion of about 85 to 100 per cent is observed. Total oil ($C_3$) and water yields of about 16 to about 35 and about 18 to about 44 bbl. per million cubic feet of fresh feed gas, respectively, are obtained.

The invention will be described further by reference to the accompanying drawings which are views in elevation partly in cross-section diagrammatically illustrating apparatus for effecting the hydrogenation of carbon monoxide according to the present invention.

Figure 1:
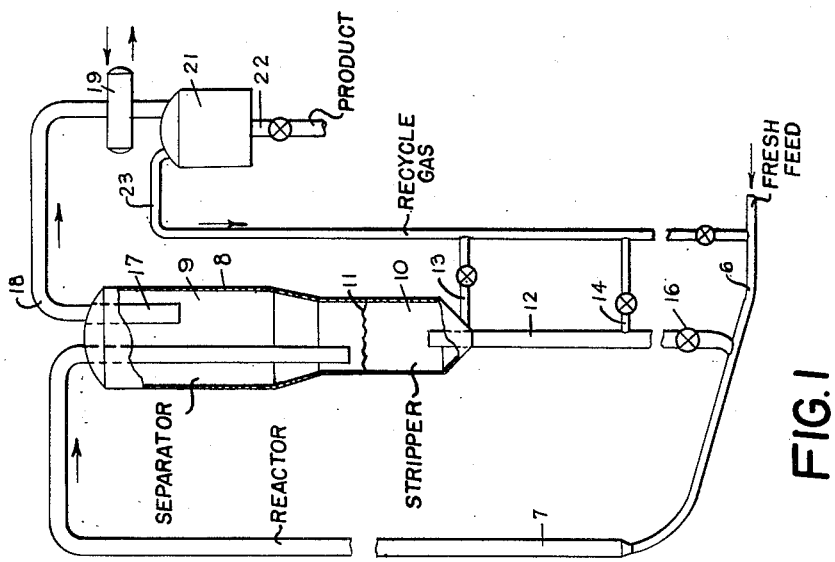

Fig. 1 of the drawings illustrates a reactor of relatively small cross-sectional dimension used to effect the hydrogenation of carbon monoxide in which the catalyst is entrained in the reaction mixture and passes through the reaction zone with the reaction mixture.

Fig. 2 illustrates a reactor of relatively large cross-sectional dimension used to effect the hydrogenation of carbon monoxide in which the finely divided catalyst is maintained in a so-called pseudo-liquid dense phase in the reaction zone and the catalyst is withdrawn overhead from the reactor.

In Fig. 1 of the drawings a synthesis reaction mixture having a gas factor of about 6–7:1 and comprising about 10 volume per cent carbon monoxide is passed through conduit 6 to elongated reactor 7. In conduit 6 the synthesis gas stream picks up finely divided hydrogenation catalyst, such as reduced iron, from standpipe 12. The catalyst loading into conduit 11 is regulated by a conventional slide valve 51 in accordance with the formula $$Cr = \frac{50}{\frac{L}{D}+5} + 0.4$$

The velocity in transfer line or conduit 6 should be sufficiently high so that the catalyst from standpipe 12 is entrained in the gas and does not settle along the walls of the conduit. The gaseous reaction mixture at a temperature of at least 550° F. for a high alkali catalyst and 450° F. for a low alkali catalyst obtained from the sensible heat of the catalyst and/or by preheating the gas stream, is passed upward through reactor 7 having a diameter, for example, of about 1 foot at a sufficiently high velocity that the heaviest catalyst particles continuously move in the direction of flow of the gases and pass overhead into separator 8. Upon passage through reactor 7, the temperature of the gaseous mixture and catalyst rises as much as 50° F.

Separator 8 comprises an upper enlarged cylindrical section 9 and a lower cylindrical section 10. Upper enlarged section 9 functions primarily as a separation zone for the separation of entrained catalyst from the gaseous reaction effluent. Lower section 10 functions primarily as a stripper and accumulator for the separated catalyst. Upon separation of the catalyst from the reaction effluent, the catalyst settles into the lower portion of stripper 10 and forms a lower dense phase of catalyst materials and an upper more dilute phase with an interface 11 therebetween. Reactor 7 preferably terminates above and adjacent the interface 11 such that the effluent gases issuing therefrom cause a highly turbulent action in the catalyst bed of stripper 10. This turbulent action prevents bridging or caking of the catalyst in the stripping zone which often occurs in small diameter strippers. Hot catalyst is stripped in stripper 10 by the introduction through conduit 13 of a suitable gaseous medium, such as hydrogen, methane, fresh feed gas and recycle gas, which may or may not be preheated as desired. The stripping is preferably carried out at a temperature between about 550 and about 650° F. The stripped catalyst passes downwardly through standpipe 12 which projects into the dense phase of stripper 10 and is recirculated to conduit 6 by means of valve 16.

A stripping or aerating gas is introduced into standpipe 12 through conduit 14. The quantity of stripping gas used in stripper 10 is between about ½ and about 10 per cent of the total reaction mixture introduced to reactor 7. Fresh catalyst is introduced into stripper 10 by means not shown.

The reaction effluent containing some entrained catalyst passes through a conventional ceramic or metallic filter 17 and conduit 18 to condenser 19. At the prevailing pressures of the reaction, condenser 19 condenses a substantial proportion of normally liquid organic products and steam which accumulate in accumulator 21 as two liquid phases, a lower water-rich phase and an upper organic phase. These liquid phases are withdrawn from accumulator 21 through conduit 22 for further treatment or purification, such as fractional distillation, extraction, and hydrogenation, to recover the organic products as products of the process. In accordance with the preferred embodiment of this invention, normally gaseous components of the stream, including hydrogen, carbon dioxide, methane and some higher boiling hydrocarbons are recycled through conduit 23 to inlet conduit 6 in order to adjust the ratio of hydrogen and carbon dioxide to carbon monoxide in the inlet gas stream. Fresh feed gas is introduced into the system through conduit 5. A portion of the recycle gas in the preferred embodiment of the invention is passed through conduits 13 and 14 to stripper 10 to assist in removal of reaction products, particularly waxes and relatively high-boiling organic compounds, from the catalyst by stripping.

Stripped catalyst may be recycled to reactor 7 by means of recycle gas alone and fresh feed gas introduced separately from recycled catalyst into reactor 7 by means not shown without departing from the scope of this invention.

Catalyst may be used indefinitely without regeneration when operations according to this invention are employed. However, regeneration of the catalyst is not to be excluded from the scope of this invention and in some instances regeneration may be desirable.

Condenser 19 and accumulator 21 may comprise a plurality of condensers and recovery units, such as distillation columns, etc., for separating the gaseous components from the reaction effluent. A portion of the gases in conduit 23 may be passed to a conventional carbon dioxide absorption unit to remove carbon dioxide, if desired. After removal of the carbon dioxide the remaining gaseous components are recycled as previously described. In a modification of the present invention, the recycle gases in conduit 23 are reheated by means not shown to the desired temperature before introduction into conduit 6 and into stripper 10 to preheat the fresh feed and to aid in stripping the catalyst. This gas stream in conduit 23 may also be cooled, if necessary, in order to control the temperature in reactor 7. The heating and cooling of the recycle gases and the amount introduced into conduit 6 are adjusted such that a gas of the desired composition is obtained at an appropriate initial reaction temperature taking into account the sensible heat of the catalyst recirculated through standpipe 12. Alternatively or in addition to the above method of controlling the temperature of reaction a single cooler or a plurality of coolers may be provided on reactor 7 for indirect cooling of the reaction mixture therein. Also, a suitable cooling medium, such as a vaporizable liquid or a cooled gas, may be injected directly into the reaction mixture in reactor 7 at a plurality of longitudinally spaced points without departing from the scope of this invention. For purposes of calculating the charging rate, the overall length of the reactor (L) includes such cooling sections.

Fig. 2 of the drawing illustrates the apparatus for effecting the conversion of hydrogenation or carbon monoxide in the presence of a pseudo-liquid dense phase of finely divided reduced iron catalyst. According to Fig. 2 a reaction mixture comprising hydrogen and carbon monoxide of the desired composition supplemented by recycle gas, if desired, is passed through conduit 46 after picking up recirculated and stripped catalyst from standpipe 58 and the resulting mixture of gas and catalyst is introduced into enlarged reactor 47. The gas velocity and dimensions of reactor 47 are such that a pseudo-liquid dense phase of iron catalyst is formed therein having an initial density of at least about 35 pounds of catalyst per cubic foot. The amount of catalyst per cubic foot of carbon monoxide introduced into the reaction mixture is regulated by a slide valve 59.

Relatively high gas velocities within the range permissible for dense phase operations are desirable in order to minimize eddy currents of gases in the dense phase which eddy currents cause over-contacting of the gaseous reactants. Over-contacting of the gaseous reactants increases the production of undesirable products, such as relatively high molecular weight compounds which tend to deposit on the catalyst. Superficial gas velocities (taking into account contraction and excluding the volume occupied by the catalyst) between about 4 and about 5 feet per second are preferred for dense phase operations.

In reactor 47 interaction between hydrogen and carbon monoxide is effected under those conditions suitable for the production of normally liquid organic compounds. In the preferred manner of operation of reactor 47 the pseudo-liquid dense phase substantially fills the entire reactor and catalyst passes overhead through conduit 48 into a separator 49. Reaction gases containing the products of the hydrogenation reaction and catalyst equivalent to that amount charged from standpipe 58, is passed through conduit 48 to a separator 49. In the separator 49 entrained catalyst is separated from the reaction effluent. The reaction effluent is passed through a metallic filter 61 and conduit 62 to subsequent separation and recovery equipment. Separated catalyst settles through a funnel shaped septum 52 into stripper 53. In stripper 53, aerated catalyst is maintained therein as a dense phase having an interface 54 above the lower U-shaped end of septum 52. Stripping gas is passed into stripper 49 through conduit 56 and is removed therefrom through conduit 57. In this manner the stripping gas is not admixed with the gaseous effluent as in the case of Fig. 1; consequently, such gases as natural gas, nitrogen, hydrogen, carbon dioxide, and steam, may be used to advantage in this type of system since they cannot contaminate the reaction effluent and do not require subsequent removal from the product gas. Septum 52 and the level of catalyst above the end of the funnel shaped terminus provides an effective seal between separator 49 and stripper 53. Stripped catalyst substantially free from waxes and carbonaceous deposits is passed from stripper 53 through standpipe 58 and recirculated to conduit 46 by means of valve 59. Gas is introduced into standpipe 58 through conduit 63 to aerate and/or strip the catalyst therein.

Although in the modification shown in Fig. 2, the catalyst is discharged with the reaction effluent in conduit 48 a standpipe (not shown) may be provided leading from the dense phase in reactor 47 to conduit 46 for removal and recirculation of the catalyst therefrom. In such a case the standpipe may constitute the stripping zone into which a suitable stripping and aerating gas is injected in an amount and at a temperature sufficient to remove from the catalyst reaction products, such as waxes and relatively high boiling hydrocarbons, before return to reactor 47.

Reactor 47 may comprise a single reactor as shown or a series of reactors and coolers. Indirect cooling means may be provided within reactor 47 to maintain the desired temperature of reaction. Alternatively or additionally a cooling medium, such as a vaporizable liquid, may be introduced directly into the dense phase of reactor 47.

The following example is offered as a means of better understanding the present invention and its application to the hydrogenation of carbon monoxide and the specific recitation of certain limitations therein is not considered to unnecessarily limit the present invention.

EXAMPLE

Three runs were made on a reduced iron catalyst in which different amounts of CO were contacted per pound of catalyst. In each of the examples a substantially completely reduced iron catalyst containing between 0.5 and 1.4 per cent by weight of potassium calculated as an oxide was used. The catalytic material was pulverized and had a particle size in accordance with Table I below:

*Table I*

| Roller Analysis | Wt. Percent |
|---|---|
| Microns: | |
| 0–10 | 16.2 |
| 10–20 | 17.0 |
| 20–40 | 19.2 |
| 40–60 | 24.0 |
| 60+ | 23.6 |
| Density (basis water) | 6.8 |

Having prepared a catalyst of the desired properties and the required size, the catalyst was introduced together with synthesis gas into a reactor and the gaseous mixture passed upwardly therethrough. In Tables II and III which follow, run 1 shows a comparison at the end of 100 hours of operation and at the end of 500 hours of operation for a system in which the catalyst remains in the reaction zone throughout the run. Runs 2 and 3 show the results after 100 and 500 hours of operation in which contact of CO per pound of catalyst was limited by circulating the catalyst through the reaction zone in a manner similar to that described with reference to Fig. 1. The velocity of the gaseous stream in runs 2 and 3 was sufficiently high that the catalyst was entrained in the gaseous reaction mixture passing through the reaction zone. After separation from the gaseous stream the catalyst was stripped with recycle gas at a temperature of about 600° F. and recirculated to the inlet transfer line.

Table II

| Run No | 1 | | 2 | | 3 | |
|---|---|---|---|---|---|---|
| Age of catalyst | 100 | 500 | 134 | 522 | 118 | 501 |
| D (Aver. diameter of reactor in inches) | 8 | 8 | 49 | 4 | 1.5 | 1.5 |
| L/D | 18 | 18 | 120 | 120 | 300 | 300 |
| Cr, lbs. cat./S. C. F. of CO | 0 | 0 | 6.4 | 7.7 | 2.6 | 0.57 |
| Alkali content of catalyst, percent | 1.1 | 1.1 | 0.5 | 0.5 | 1.4 | 1.4 |
| Operating Conditions: | | | | | | |
| Pressure, p. s. i. g | 85 | 165 | 250 | 250 | 80 | 250 |
| Total Feed, S. C. F./hr | 6,540 | 9,800 | 16,000 | 14,295 | 1,310 | 2,140 |
| Fresh Feed, S. C. F./hr | 1,620 | 6,300 | 6,560 | 4,820 | 220 | 410 |
| Gas Factor | 11 | 7 | 7.4 | 7.2 | 4.8 | 3.7 |
| Fresh Feed, $H_2:CO$ | 4 | 3.5 | 3.3 | 2.9 | 3.0 | 1.9 |
| Inlet gas analysis— | | | | | | |
| CO, percent | 5 | 10 | 9.6 | 10.1 | 16.7 | 17.9 |
| $CO_2$, percent | 2.7 | 7.5 | 8.7 | 15.3 | 8.5 | 30.3 |
| Recycle: Fresh Feed (volume) | 3 | 0.6 | 1.4 | 2.0 | 4.9 | 4.2 |
| Reactor conditions— | | | | | | |
| Average Temp., °F | 580 | 585 | 595 | 600 | 613 | 611 |
| Maximum temp., °F | 590 | 590 | 605 | 609 | 622 | 626 |
| Catalyst density, lbs./cu. ft. | 71 | 62 | 37 | 33 | 6.3 | 21.8 |
| Gas Velocity, ft./sec | 2.0 | 1.7 | 5.8 | 5.3 | 9.4 | 5.3 |
| Total Cat. in reactor, lbs. of Fe | 240 | 250 | 148 | 135 | 3.5 | 10.8 |
| Gas inlet temp., °F | 565 | 422 | [1] 570 | [1] 590 | [1] 598 | [1] 582 |
| Stripper Conditions— | | | | | | |
| Max. temp., °F | | | 602 | 599 | 614 | 632 |
| Density of Cat., lbs./cu. ft. | | | 73 | 72 | 52 | 62 |
| Gas velocity, ft./sec | | | 0.3 | 0.24 | 0.55 | 0.28 |
| Total catalyst in stripper, lbs. of Fe | | | 130 | 128 | | |

[1] Gas—Catalyst mix temperature.

Table III

| Run No | 1 | | 2 | | 3 | |
|---|---|---|---|---|---|---|
| Age of Catalyst | 100 | 500 | 134 | 522 | 118 | 504 |
| D | 8 | 8 | 4 | 4 | 1.5 | 1.5 |
| L/D | 18 | 18 | 120 | 120 | 300 | 300 |
| Cr | 0 | 0 | 6.4 | 7.7 | 2.6 | 0.57 |
| Results: | | | | | | |
| CO disappearance/pass, percent | 86 | 95 | 91 | 75 | 14 | 25 |
| $CO_2$ disappearance/pass, percent | 46 | 16 | 18 | 6 | 0 | 2 |
| Oil $C_3+$, bbls./M. M. C. F. of F. F | 21 | 20 | 30 | 30 | 8.3 | 24 |
| Water, bbls./M. M. C. F. of F. F | 40 | 25 | 40 | 36 | 13.3 | 26 |
| Selectivity: | | | | | | |
| Percent $CO \rightarrow CH_4+C_2$ | 44 | 35 | 21 | 24 | 23 | 16 |
| Percent $CO \rightarrow C_3+(Oil)$ | 47.5 | 56.5 | 72 | 67.5 | 60.3 | 62.2 |
| Percent $CO \rightarrow Oxy$. Chemicals | 8.5 | 8.5 | 7 | 8.5 | 16.7 | 21.8 |
| Catalyst: | | | | | | |
| Oil and Wax, Percent | 2 | 7 | 0.3 | 1.5 | 0.2 | 3.7 |
| Carbon | 10 | 14 | 6.2 | 6.9 | 8 | 14.7 |
| Iron | 78 | 71 | 81 | 73 | | |

The data of Tables II and III are self explanatory. The yield of oil of runs 2 and 3 indicates the greater selectivity of the hydrogenation process when operated according to the teachings of this invention. The total feed input for run 2 is much greater than run 1 indicating increased capacity attainable with the present process. As shown in Tables II and III, the stability of the catalyst is increased by high catalyst loading rates indicated by the decrease in oil and wax on the catalyst in runs 2 and 3.

No regeneration of the catalyst was effected in any of the runs. In runs 2 and 3 the catalyst passed overhead with the effluent, was stripped with recycle gas and then recycled to the reactor.

The theory advanced in connection with this invention should not be construed to unnecessarily limit the invention and is only one of several possible explanations for the improved results obtained. Various condensers, coolers, valves, storage tanks, fractional distillation columns, etc., have been omitted from the drawings as a matter of convenience and clarity, and their use and location will become apparent to those skilled in the art. Various modifications and alterations of the apparatus and flow will become apparent to those skilled in the art without departing from the scope of this invention.

In general, the teachings of the invention apply to all conventional metal hydrogenating catalysts suitable for the hydrogenation of carbon monoxide. The formula devised is particularly applicable to metal hydrogenating catalysts comprising iron, such as a reduced iron catalyst. This application is a continuation-in-part of our prior and copending application Serial No. 726,620 filed February 5, 1947, in which we disclose in detail the operation of a high velocity system, preparation of the catalyst, and apparatus.

We claim:

1. A process for the hydrogenation of carbon monoxide to produce organic compounds having more than one carbon atom per molecule which comprises passing a finely divided hydrogenating catalyst comprising iron and an alkali as a promoter and a gaseous mixture comprising hydrogen and carbon monoxide through a first confined passageway to the lower portion of an elongated reaction zone having a shape factor of at least 10, passing gases upward through said elongated reaction zone at a linear gas velocity of at least about 5 feet per second to suspend said catalyst in the gases such that the concentration of catalyst in said gases is not greater than about 35 pounds per cubic foot and such that finely divided catalyst moves in the direction of flow of gases in said elongated reaction zone, converting carbon monoxide to organic compounds in said reaction zone, removing from the upper portion of said elongated reaction zone a gaseous effluent containing finely divided catalyst, passing said gaseous effluent to a separation zone externally of said reaction zone in which catalyst is separated from gases, recovering organic compounds having more than one carbon atom per molecule from the gaseous effluent as products of the process, withdrawing catalyst from said external separation zone, passing catalyst thus withdrawn directly downwardly through a second confined passageway situated externally of said reaction zone and said separation zone, removing from said catalyst in said second confined passageway occluded carbonaceous deposits formed thereon during the hydrogenation reaction, passing catalyst through said second confined passageway directly to said first confined passageway whereby the catalyst is returned to said reaction zone, circulating the catalyst through the aforesaid circuit at a rate at least equivalent to that defined by the following formula:

$$Cr = \frac{50}{\frac{L}{D}+5} + 0.4$$

where $Cr$ is equal to the pounds of recycled iron per standard cubic foot of carbon monoxide introduced into said reaction zone, $L$ is equal to the vertical length of the reaction passageway, and $D$ is equal to the average diameter of the reaction passageway; maintaining the aforesaid circuit at a temperature between about 550° F. and about 650° F. and at a pressure between about 50 and about 500 pounds per square inch gage at substantially all times, and cooling said reaction zone by indirect heat exchange to maintain the temperature within the above range.

2. A process for the hydrogenation of carbon monoxide to produce organic compounds having more than one carbon atom per molecule which comprises passing finely divided hydrogenation catalyst comprising iron and a gaseous mixture comprising hydrogen and carbon monoxide through a first confined passageway to the lower portion of an elongated reaction zone having a shape factor of at least about 5, passing gases upward through said elongated reaction zone at a linear gas velocity above about 4 feet per second to fluidize the finely divided metal hydrogenation catalyst, converting carbon monoxide to organic compounds in said reaction zone, removing from the upper portion of said elongated reaction zone a gaseous effluent containing organic compounds having more than one carbon atom per molecule, removing finely divided catalyst from said reaction zone, recovering organic compounds having more than one carbon atom per molecule from the gaseous effluent as products of the process, passing catalyst thus removed from said reaction zone downwardly through a second confined passageway situated externally of said reaction zone, removing from said catalyst in said second confined passageway occluded carbonaceous deposits formed on said catalyst during the hydrogenation reaction, passing catalyst directly from said second confined passageway to said first confined passageway whereby said catalyst is returned to said reaction zone, circulating the catalyst through the aforesaid circuit at a rate at least equivalent to that defined by the following formula:

$$Cr = \frac{50}{\frac{L}{D}+5} + 0.4$$

where $Cr$ is equal to the pounds of recycled iron per standard cubic foot of carbon monoxide introduced into said reaction zone, $L$ is equal to the vertical length of the reaction passageway, and $D$ is equal to the average diameter of the reaction passageway; maintaining the aforesaid circuit at a temperature between about 550° F. and about 650° F. and at a pressure between about 50 and about 500 pounds per square inch gage at substantially all times, and cooling said reaction zone by indirect heat exchange to maintain the temperature within the above range.

3. A process according to claim 2 in which the shape factor of said reactor is between about 5 and about 10.

4. The process of claim 2 in which at least 2.6 pounds of catalyst per standard cubic foot of carbon monoxide is circulated through said circuit.

LUTHER R. HILL.
HENRY G. McGRATH.

References Cited in the file of this patent

UNITED STATES PATENTS

| Number | Name | Date |
|---|---|---|
| 2,266,161 | Campbell et al. | Dec. 16, 1941 |
| 2,360,787 | Murphree et al. | Oct. 17, 1944 |
| 2,414,276 | Sensel et al. | Jan. 14, 1947 |
| 2,417,164 | Huber, Jr. | Mar. 11, 1947 |
| 2,464,505 | Hemminger | Mar. 15, 1949 |
| 2,472,377 | Keith | June 7, 1949 |
| 2,481,089 | Dickinson | Sept. 6, 1949 |
| 2,500,516 | Carpenter | Mar. 14, 1950 |